April 26, 1966      E. E. ROTH      3,247,950
LIVE ROLLER CONVEYOR
Filed Sept. 14, 1964
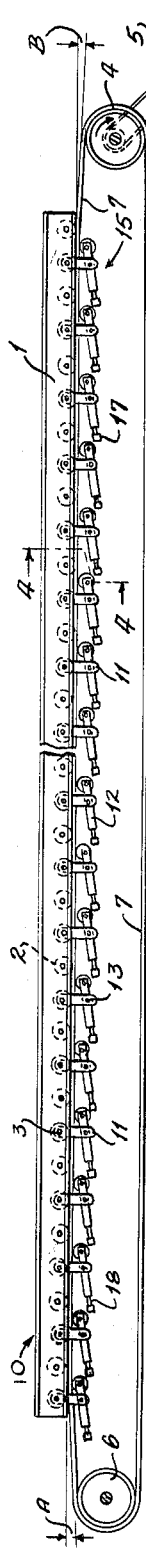
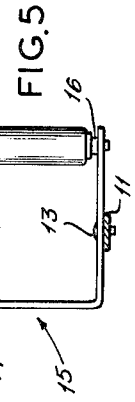
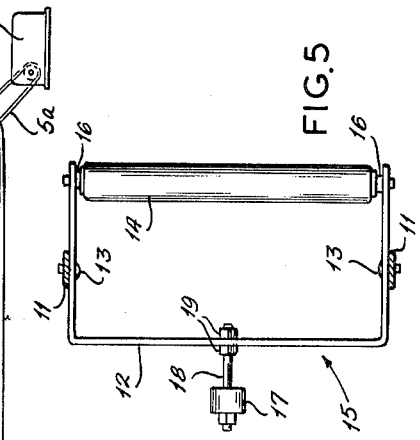
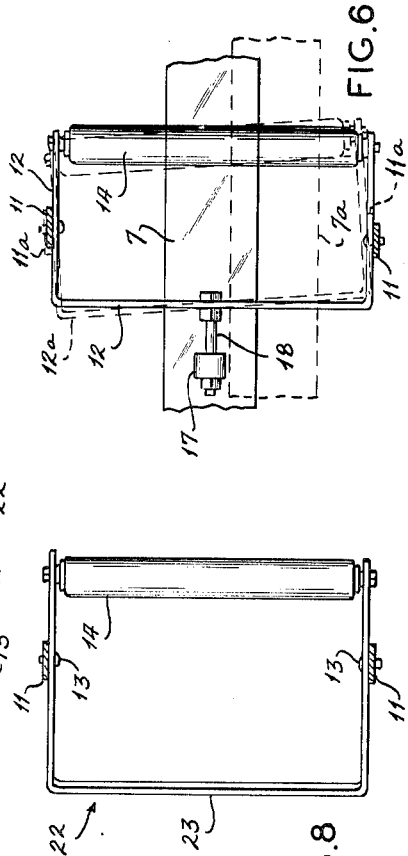
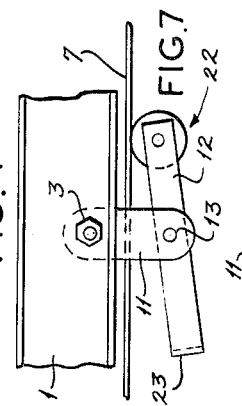
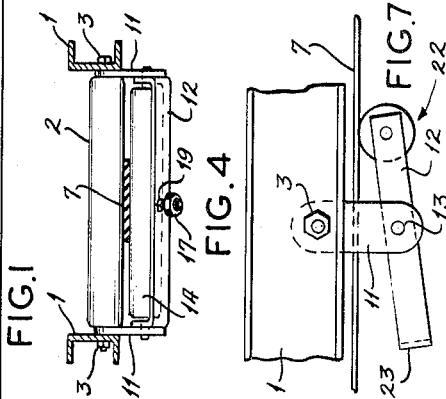
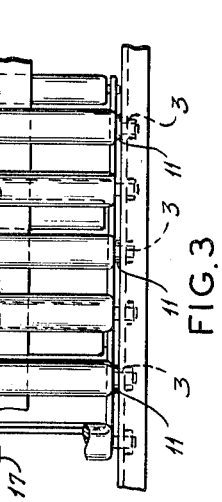
INVENTOR:
ERNEST E. ROTH
BY
Gravely, Lieder & Woodruff
ATTORNEYS.

United States Patent Office 3,247,950
Patented Apr. 26, 1966

3,247,950
LIVE ROLLER CONVEYOR
Ernest E. Roth, Arnold, Mo., assignor to Alvey Conveyor
Manufacturing Company, St. Louis, Mo., a corporation
of Missouri
Filed Sept. 14, 1964, Ser. No. 396,043
6 Claims. (Cl. 198—127)

This invention relates to live roller conveyors and more particularly to live roller conveyors employing automatic load compensating means.

In belt driven live roller conveyors one of the chief problems encountered is the adverse affect to the drive belt under the normally fluctuating conveyor load. Thus, at various times a live roller conveyor will be carrying heavy loads which subject the rollers to frictional loads that are transmitted to the drive belt as excessive drag. Likewise, extremely light loads on the conveyor rollers offer little frictional resistance and consequently the frictional load decreases frictional drag on the drive belt. The most severe condition for a live roller conveyor drive is a heavy load or dead load for some reason such as back log at the next station. Such difficulties cause excessive wear of the drive belts which would be desirable to avoid. Others have attempted conveyor sensors to detect heavy loads or dead loads on the live rollers to disengage the drive belt from the live rollers.

The present invention avoids the problem of heavy loads and dead loads present on live roller conveyors increasing the frictional drag on the drive belt. Briefly, the invention affords an automatic load compensating mechanism which coacts with the drive belt under varying frictional loading to vary the degree of frictional engagement between the drive belt and the driven live rollers. In accomplishing this coaction the drive belt is such that the drive pass, considering the belt as being stretched taut and weightless, would define a droopless path along a plane below the bottom of a plane defined by the live rollers. Under such droopless path conditions, the drive pass of the belt would not drivingly encounter the live rollers. The belt is counterbalanced by a roller assembly depending from the conveyor structure and adjusted so that rollers engage the drive belt and bias it into engagement with the live rollers. Thus the load compensating means biases the belt above a droopless path into engagement with the live rollers. Whenever the frictional loading varies due to dead loads or heavy loads on the live rollers, the drive belt with increased frictional drag tends to stretch taut, thus counterpoising the load compensator to vary the frictional engagement between the drive belt and the live rollers.

It is therefore an object of the invention to provide a live roller conveyor having automatic load compensating means which biases the drive belt and absorbs counterpoise forces created by tensioning of the belt drive under frictional drag.

It is another object of the invention to provide a live roller conveyor in which the live roller drive belt under varying frictional loading varies a counterpoise force against a counterweighted roller load compensator.

It is another object of the invention to provide a live roller conveyor in which the drive belt defines a droopless path along a plane below the planar conveyor path defined by the live rollers, the droopless path of the drive belt being incapable of encountering a live roller.

It is a further object of the invention to provide a live roller conveyor having a drive belt defining a droopless path along a plane below the planar transport path of the conveyor along which the drive belt is incapable of engaging the live rollers, and having a depending pivoted carriage which supports a counterweighted roller adjusted to bias the drive belt out of said droopless path and into engagement with the live rollers, said counterweighted rollers capable of yielding in proportion to the frictional drag on the drive belt.

It is a further object of the invention to provide a live roller conveyor in which the drive belt defines a droopless path along a plane below the planar transport path of the conveyor and is incapable of engaging the live rollers which coacts with a load compensator having an idler roller that engages and biases the drive belt against the live rollers, the load compensating idler roller being suspended by a counterweighted frame which permits either end of the roller to tilt to either side, hence, whenever the belt tends to increase the drag along one side or the other of the load compensating idler rollers, the side on which the belt causes the most drag will be raised and the other side lowered tending to self-center the drive belt.

These and other objects and advantages of the invention will become apparent from the ensuing description and the appended claims in conjunction with the drawings, wherein:

FIG. 1 illustrates a side elevation view of a conveyor embodying the present improvements;

FIG. 2 is an enlarged fragmentary side elevation of the conveyor depicted in FIG. 1;

FIG. 3 is a fragmentary plan view of the conveyor in FIG. 1;

FIG. 4 is a cross sectional view of the conveyor taken along the line 4—4 in FIG. 1;

FIG. 5 is a plan view of the automatic load compensator member;

FIG. 6 illustrates the self-centering feature of the load compensator for maintaining the drive belt centered under the live rollers;

FIG. 7 is a side elevation view of a modified load compensating roller; and

FIG. 8 is a plan view of the load compensating member in FIG. 7.

Referring now to the drawings and specifically FIGURES 1–5, live roller conveyor 10 has a pair of side rail channels 1 which are spaced apart and journal transport or live rollers 2 in bearings 3. The conveyor has belt exit drum 4, which may be propelled by belt 5a of motor drive 5 suitably journaled near one end of conveyor 10, and has belt entrance drum 6. Both drums 4 and 6 have endless belt 7 extending thereover, yet beneath the rollers 2.

The peripheries of drums 4 and 6 define a tangent planar path below the planar travel path of conveyor 10 defined by transport rollers 2. Thus, if belt 7 were stretched taut and were weightless, then belt 7 would define a droopless path along a plane below the planar transport path of conveyor 10. Also, under such droopless conditions the drive pass of belt 7 would not drivingly engage rollers 2. Note angles A and B depicting displacement between the plane of rollers 2 and the plane defined by drums 4 and 6. Some load compensators, generally denoted by numeral 15, are suspended either from side rails 1 or from bearings 3 for rollers 2. Load compensators 15 include hangers 11 which are rotatably journaled in pairs from side rails 1 along bearings 3. Pairs of hangers 11 support yoke 12. Each hanger 11 independently supports one side of yoke 12 on pivot pins 13. The yoke 12 supports load compensating or idler roller 14 journaled in bearings 16 at the open end of such yoke 12. Counterweight 17 is attached to counterweight shaft 18 which is attached to yoke 12 by jam nuts 19. Each yoke 12 is free to pivot about pins 13. Counterweights 17 are adjusted so that idler rollers 14 bias belt 7 above the droopless path to engage live rollers 2. With load compensators 15 adjusted in such manner, any tensioning of endless belt 7 tends to counterpoise load compensator 15 by moving idler rollers 14 downward from rollers 2 against the upward force attributable to counterweights 17.

Load compensators 15 provide conveyor 10 with the further function of self-centering belt 7. With reference to FIGURE 6, belt 7 is depicted in the normal position centered over idler roller 14 with hangers 11 depending at the same angle on each side of yoke 12. If belt 7 moves to position 7a, hangers 11 take a position 11a because of the increased frictional drag by belt 7 near the side of roller 14. The unbalanced frictional drag on roller 14 is translated to unequal loading on the sides of yoke 12 which reacts to rotate hangers 11 through unequal arcs raising yoke 12 and roller 14 at the side under belt 7 or at position 7a. The tendency for roller 14 to raise at the side undergoing highest frictional drag from belt 7 creates a force which moves belt 7 back to the centered position over rollers 14.

Referring to FIGURES 7 and 8, load compensator 20, a modified version of load compensator 15, is suspended from hangers 11 by pivot pins 13. Compensator 20 includes yoke 22 which is suspended on pivot pins 13 closer to roller 14 than center bar 23 of yoke 22.

In operation of conveyor 10, motor drive 5 rotates exit drum 4 via belt 5a in a clockwise direction. Endless belt 7 extending over drums 4 and 6 is driven in a path from drum 6 to drum 4. Idler rollers 14 of load compensator 15 bias moving belt 7 into frictional driving engagement with live rollers 2, thus turning rollers 2 in a counterclockwise direction. Load compensator 15 is initially adjusted for a usual conveyor load. Hence, the amount of frictional loading of belt 7 for normal operation under a usual load is established. Under the influence of heavier loads or load stoppage, transport rollers 2 have a higher frictional load than usual. Such higher frictional load is transmitted to drive belt 7 in the form of increased frictional drag against the underside of rollers 2. Because of the increased frictional drag, drive belt 7 tensions or becomes more taut. The tensioning of belt 7 is absorbed by load compensators 15. Thus, the tensioning of drive belt 7 counterpoises the load compensator 15. Counterwise, whenever no load or a lighter than the usual load is carried by transport rollers 2, slackening of drive belt 7 occurs because of reduced frictional loading or drag thereon from rollers 2. From the foregoing it will be understood that load compensators 15 afford the drive belt a self-centering feature and a uniform frictional drive loading under nearly any and all transport roller 2 load conditions.

The invention has been disclosed in the foregoing several embodiments, and it will be apparent to those skilled in the art that various modifications and changes may be made which do not depart from the spirit and scope of the invention as is limited only as necessitated by the scope of the appended claims.

What is claimed is:

1. A live roller conveyor comprising a roller conveyor support structure, load transport rollers journaled along said support structure defining a planar transport path, an entrance guide drum journaled at one end of said support structure, an exit guide drum journaled at the other end of said support structure, a drive belt having a drive pass extending over said entrance and exit drums and under said transport rollers, the belt drive pass over said exit guide drum and said entrance guide drum defining a tangent line between the peripheries thereof below said transport path free of contact with said transport rollers, load compensator means depending from said support structure, said load compensator means having a free counterweighted idler roller operably carried thereon in position to raise said drive belt into engagement with said transport rollers and thereby elevate said drive pass above said tangent line, said drive belt tensioning under frictional loading from said transport rollers to counterpoise said idler rollers, and drop said drive pass toward said tangent line.

2. A live roller conveyor comprising a roller conveyor support structure, load transport rollers journaled along said support structure defining a planar transport path, an entrance guide drum journaled at one end of said support structure, an exit guide drum journaled at the other end of said support structure, a drive belt having a drive pass extending over said entrance and exit drums and under said transport rollers, the belt drive pass over said exit guide drum and said entrance guide drum defining a tangent line between the peripheries thereof below said transport path free of contact with said transport rollers, and compensator means includes a plurality of frames depending from said support structure, and spaced along the conveyor between said drums and under said belt drive pass, a free counterweighted idler roller on each frame in position to jointly raise said belt drive pass into engagement with said transport rollers and thereby elevate the belt drive pass above said tangent line, said drive belt tensioning under frictional loading from said rollers to counterpoise said idler rollers and drop said drive pass toward said tangent line.

3. A live roller conveyor comprising a conveyor support frame, a plurality of load transfer rollers journaled along said support frame and arranged to define a horizontal flat path along the upper peripheries thereof, a drive belt disposed beneath said transfer rollers and having a drive pass at a level when sufficiently taut to define a droopless path out of engagement with the under peripheries of said transfer rollers, drive means to propel said drive belt, and a plurality of counterweighted idler rollers distributed along and suspended from said support structure to elevate said belt drive pass at a plurality of points into engagement with substantially all of said transport rollers, said belt normally being flexible to respond to said idler rollers and elevate, and tensioning under frictional loading from said transport rollers to counterpoise said idler rollers and drop toward said droopless path.

4. A live roller conveyor comprising a roller conveyor support structure, load transport rollers journaled along said support structure defining a load path, an entrance drum journaled at one end of said support structure, an exit drum journaled at the other end of said support structure, an endless belt extending over said entrance and exit drums and under said transport rollers, said belt having a drive pass extending between said entrance and exit drums defining a tangent line between the peripheries thereof below said load path, and counterbalanced idler rollers spaced along said drive pass to lift said endless belt into engagement with said transfer rollers, said belt tensioning under frictional loading from said transfer rollers to counterpoise said idler rollers and drop away from said transport rollers.

5. A live roller conveyor comprising a conveyor support frame, load transport rollers journaled along said support frame defining a flat transfer path, a drive belt disposed beneath said transport rollers having a drive pass defining a droopless path below said transfer rolls and out of engagement therewith, drive means to propel said drive belt, a load compensator frame suspended from a pair of independently pivoted hangers depending from said support structure, said load compensating frame having a counterweighted idler roller lifting said drive belt into engagement with said transport rollers, said drive belt tensioning under frictional loading from said transport rollers to counterpoise said idler rollers and drop away from said transport rollers.

6. A live roller conveyor comprising a roller conveyor support structure, load transport rollers journaled along said support structure defining a planar transport path, an entrance guide drum journaled at one end of said support structure, an exit guide drum journaled at the other end of said support structure, a drive belt having a drive pass extending over said entrance and exit drums and under said transport rollers, the belt drive pass over said exit guide drum and said entrance guide drum defining a tangent line between the peripheries thereof below said transport path free of contact with said transport rollers, a pair of independently pivoted hangers depending from said support structure, a load compensator frame suspended from said pair of hangers said load compensating frame having a counterbalanced idler roller lifting said drive belt into engagement with said transport rollers, said drive belt tensioning under frictional loading from said transport rollers to counterpoise said idler rollers and drop away from said transport rollers.

References Cited by the Examiner

UNITED STATES PATENTS

| | | | |
|---|---|---|---|
| 1,598,099 | 8/1926 | Murray | 198—129 |
| 1,614,816 | 1/1927 | York | 198—127 |
| 3,012,652 | 12/1961 | Poel et al. | 198—127 |
| 3,064,797 | 11/1962 | Besel et al. | 198—127 |

FOREIGN PATENTS 1,346,408  11/1963  France.

EVON C. BLUNK, *Primary Examiner.*

SAMUEL F. COLEMAN, *Examiner.*

R. WALKER, *Assistant Examiner.*